US 12,041,016 B2

United States Patent
Kang

(10) Patent No.: US 12,041,016 B2
(45) Date of Patent: Jul. 16, 2024

(54) METHOD AND SYSTEM FOR RECOMMENDING A BOT FOR MANAGING CHAT ROOMS ON INSTANT MESSAGING APPLICATION

(71) Applicant: LINE Plus Corporation, Seongnam-si (KR)

(72) Inventor: Eun Bin Kang, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 2 days.

(21) Appl. No.: 17/964,216

(22) Filed: Oct. 12, 2022

(65) Prior Publication Data
US 2023/0128488 A1 Apr. 27, 2023

(30) Foreign Application Priority Data
Oct. 27, 2021 (KR) .................. 10-2021-0144296

(51) Int. Cl.
*H04L 51/02* (2022.01)
*H04L 51/212* (2022.01)
*H04L 51/216* (2022.01)
*H04L 65/1093* (2022.01)

(52) U.S. Cl.
CPC ............ *H04L 51/02* (2013.01); *H04L 51/212* (2022.05); *H04L 51/216* (2022.05); *H04L 65/1093* (2013.01)

(58) Field of Classification Search
None
See application file for complete search history.

(56) References Cited

U.S. PATENT DOCUMENTS

| | | | | |
|---|---|---|---|---|
| 9,285,869 B2* | 3/2016 | Hauser | ............ | G06F 3/01 |
| 10,179,291 B2* | 1/2019 | Thomas | ............ | A63F 13/87 |
| 11,138,388 B2* | 10/2021 | Emery | ............ | G06F 16/3329 |
| 11,494,440 B1* | 11/2022 | Black | ............ | G06F 40/35 |
| 2006/0036580 A1* | 2/2006 | Stata | ............ | G06F 16/3349 |
| 2009/0191898 A1* | 7/2009 | Lewis | ............ | H04W 4/02 455/456.3 |
| 2012/0166935 A1* | 6/2012 | Abhyanker | ............ | G06Q 30/02 715/234 |
| 2016/0301639 A1* | 10/2016 | Liu | ............ | H04L 51/52 |

(Continued)

FOREIGN PATENT DOCUMENTS

WO WO-2005052719 A2 * 6/2005 ........... G06F 17/276

OTHER PUBLICATIONS

NPL to Brian Hendriks; "chat-bot-profanity-filter"; Published on May 19, 2020; retrieved online on Dec. 8, 2023 from https://github.com/dolthub/chat-bot-profanity-filter. (Year: 2020).*

*Primary Examiner* — Dhairya A Patel
*Assistant Examiner* — Sandarva Khanal
(74) *Attorney, Agent, or Firm* — Sughrue Mion, PLLC

(57) ABSTRACT

A method includes acquiring, from a memory, a log of a chat room including a user associated with a user terminal, analyzing the log of the chat room for predetermined criteria in at least one category, determining a number of incidents in the log of the chat room of the predetermined criteria in the at least one category, and when the number of incidents of the predetermined criteria in the at least one category exceeds a predetermined threshold for the at least one category, automatically recommending a chat room bot to the user.

18 Claims, 11 Drawing Sheets

(56) References Cited

U.S. PATENT DOCUMENTS

| | | | |
|---|---|---|---|
| 2018/0150524 A1* | 5/2018 | Anger | G06F 16/9535 |
| 2018/0293983 A1* | 10/2018 | Choi | G10L 15/22 |
| 2018/0332167 A1* | 11/2018 | Lu | G06F 16/9535 |
| 2018/0367484 A1* | 12/2018 | Rodriguez | H04L 51/10 |
| 2019/0197338 A1* | 6/2019 | Goto | G06Q 50/01 |
| 2019/0215283 A1* | 7/2019 | Nahum | G06F 40/134 |
| 2020/0160458 A1* | 5/2020 | Bodin | H04L 67/53 |
| 2021/0374357 A1* | 12/2021 | Holmdahl | G06F 40/30 |
| 2022/0400024 A1* | 12/2022 | Shen | H04L 51/04 |
| 2023/0024204 A1* | 1/2023 | Bingham | G06F 9/451 |

\* cited by examiner

METHOD AND SYSTEM FOR RECOMMENDING A BOT FOR MANAGING CHAT ROOMS ON INSTANT MESSAGING APPLICATION

CROSS-REFERENCE TO RELATED APPLICATION

This application claims priority to Korean Patent Application No. 10-2021-0144296, filed in the Korean Intellectual Property Office on Oct. 27, 2021, the entire contents of which are hereby incorporated by reference.

TECHNICAL FIELD

The present disclosure relates to a method and a system for recommending a bot for managing a chat room on an instant messaging application, and specifically, to a method and a system for analyzing a log of a chat room and recommending a bot required for managing a chat room based on the analysis result.

BACKGROUND

With the proliferation of mobile devices such as smartphones and the development of the Internet, instant messaging applications have become widely used on mobile devices. Users of the instant messaging applications on their mobile devices can exchange various messages with other users via interfaces such as chat rooms.

Many conventional instant messaging applications may provide (i) a group chat room where a plurality of invited users can participate, and (ii) an open chat room where anyone can freely participate upon entering the open chat room via, for example, search or link. As the number of participants in these conventional group chat rooms and open chat rooms increases, increased resources are required to manage and operate the chat rooms, leading to problems such as increased infrastructure requirements, increased power consumption, and increased cost of operation.

Traditionally, in order to solve the problems described above associated with conventional instant messaging applications, custom bots may be implemented for assisting with the chat room operation and management. While these custom bots may be used in conjunction with traditional instant messaging applications, significant development knowledge may be required to produce a custom bot. Accordingly, a deficiency in the use of traditional custom bots is that general users without development knowledge may not be able to directly generate and use the custom bot they need.

SUMMARY

In order to solve the deficiencies associated with traditional instant messaging applications, chat rooms, and custom bots (e.g., the problems described above and/or other problems not explicitly described herein), the present disclosure provides a method for, a non-transitory computer-readable recording medium storing instructions for, and an apparatus (system) for recommending a bot for managing a chat room on an instant messaging application.

As described above, the present disclosure may be implemented in a variety of ways, including a method, an apparatus (system), or a non-transitory computer-readable recording medium storing instructions.

A method for recommending a bot for managing a chat room is provided, which may be performed by one or more processors and include acquiring, from a memory, a log of a chat room including a user associated with a user terminal, analyzing the log of the chat room for predetermined criteria in at least one category, determining a number of incidents in the log of the chat room of the predetermined criteria in the at least one category, and when the number of incidents of the predetermined criteria in the at least one category exceeds a predetermined threshold for the at least one category, automatically recommending a chat room bot to the user.

The method may further include, in response to an input by the user requesting to apply the chat room bot, applying the chat room bot to the chat room.

The predetermined criteria in one of the at least one categories includes a forbidden word among messages in the chat room within a first predetermined period of time, and the chat room bot may include at least one of: (i) a forbidden word filter bot configured to automatically manage a message including forbidden word, and a force eject bot configured to automatically manage a participant who sent the message including the forbidden word.

The forbidden word may include a plurality of textual characters predefined by at least one of a service administrator and the user.

The determining the number of incidents in the log of the chat room of the forbidden word includes calculating, among the messages in the chat room within the first predetermined period of time, the number of messages that include forbidden word, and the predetermined threshold for one of the at least one categories is a first threshold, and the recommending the chat room bot to the user based on the analysis result of the log of the chat room may include in response to determining that the number of the messages including forbidden word is equal to or greater than the first threshold, recommending the forbidden word filter bot to the user.

The determining the number of incidents in the log of the chat room of the forbidden word includes calculating, among participants who sent a message including the forbidden word among the messages in the chat room within the first predetermined period of time, a proportion of participants who were force ejected from the chat room, the predetermined threshold for one of the at least one categories is a second threshold, and the automatically recommending the chat room bot to the user may include in response to determining that the proportion of the force ejected participants from the chat room is equal to or greater than the second threshold, recommending the force eject bot to the user.

The determining the number of incidents in the log of the chat room of the forbidden word includes calculating, among participants who sent a message including the forbidden word among the messages in the chat room within the first predetermined period of time, the number of participants who were force ejected from the chat room, the predetermined threshold for one of the at least one categories is a third threshold, and the automatically recommending the chat room bot to the user may include, in response to determining that the number of the force ejected participants from the chat room is equal to or greater than the third threshold, recommending the force eject bot to the user.

The predetermined criteria in one of the at least one categories includes a degree of participation of the participants in the chat room within a second predetermined period of time, and the chat room bot may include an encouragement bot configured to increase the degree of participation of the participants in the chat room.

The determining the number of incidents in the log of the chat room of the degree of participation of the participants includes calculating a participation rate of the chat room based on a total number of the participants in the chat room and a number of the participants who sent at least a fourth threshold of messages within the second predetermined period of time, the predetermined threshold for one of the at least one categories is a fifth threshold, and the automatically recommending the chat room bot to the user may include, in response to determining that the participation rate of the chat room is equal to or less than the fifth threshold, recommending the encouragement bot to the user, and the encouragement bot may include an attendance check bot that is configured to notify a list of the participants who accessed the chat room within a third predetermined period of time or ranking of the degrees of participation of the participants in the chat room within the third predetermined period of time.

The fifth threshold may be determined based on an average participation rate of a plurality of chat rooms.

The determining the number of incidents in the log of the chat room of the degree of participation of the participants includes calculating the number of messages sent in the chat room within the second predetermined period of time, the predetermined threshold for one of the at least one categories is a sixth threshold, and the automatically recommending the chat room bot to the user may include, in response to determining that the number of messages sent in the chat room is equal to or less than the sixth threshold, recommending the encouragement bot to the user, and the encouragement bot may include a quiz bot that is configured to give a quiz and provide a reward to a participant who answers the quiz.

The sixth threshold may be determined based on an average number of messages in a plurality of chat rooms The predetermined criteria in one of the at least one categories includes a specific keyword or URL included in a message in the chat room within a fourth predetermined period of time, and the chat room bot may include a share bot that is configured to automatically generate frequently shared content in the chat room.

The determining the number of incidents in the log of the chat room of the specific keyword or URL included in the message may include calculating a number of times the specific keyword included in the message is sent in the chat room within the fourth predetermined period of time, the predetermined threshold for one of the at least one categories is a seventh threshold, the automatically recommending the chat room bot to the user may include, in response to determining that the number of times the specific keyword is sent is equal to or greater than the seventh threshold, recommending the share bot to the user, and the share bot may be a search bot configured to automatically provide search results for the specific keyword.

The search bot may be configured to automatically provide, in response to sensing a message including the specific keyword in the chat room, a search result for the specific keyword.

The search bot may be configured to automatically provide the search results for the specific keyword at predetermined time intervals.

The determining the number of incidents in the log of the chat room of the specific keyword or URL included in the message may include (i) determining that there is a URL pattern repeatedly included in the message in the chat room within the fourth predetermined period of time, and (ii) calculating the number of times the URL pattern is sent, the predetermined threshold for one of the at least one categories is an eighth threshold, the automatically recommending the chat room bot to the user may include, in response to determining that the number of times the URL pattern is sent is equal to or greater than the eighth threshold, recommending the share bot to the user, and the share bot may include a parsing bot that, in response to determining that a parameter of the URL pattern is updated, is configured to automatically send a URL with updated parameter to the chat room.

The chat room bot recommendation may be configured to be displayed as a system message in the chat room.

There is provided a non-transitory computer-readable recording medium storing instructions for executing the method according to the examples on a computer.

An information processing system is provided, which may include a memory, and one or more processors connected to the memory and configured to execute one or more computer-readable programs included in the memory, in which the one or more programs may include instructions for acquiring, from the memory, a log of a chat room, analyzing the log of the chat room for predetermined criteria in at least one category, determining a number of incidents in the log of the chat room of the predetermined criteria in the at least one category, and when the number of incidents of the predetermined criteria in the at least one category exceeds a predetermined threshold for the at least one category, automatically sending a chat room bot recommendation to a user terminal associated with a user included in the chat room.

As an advantage over traditional methods and systems, by analyzing the log of the chat room, and automatically sensing and recommending a bot required for managing the chat room, it is possible to save resources required to operate the chat room.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
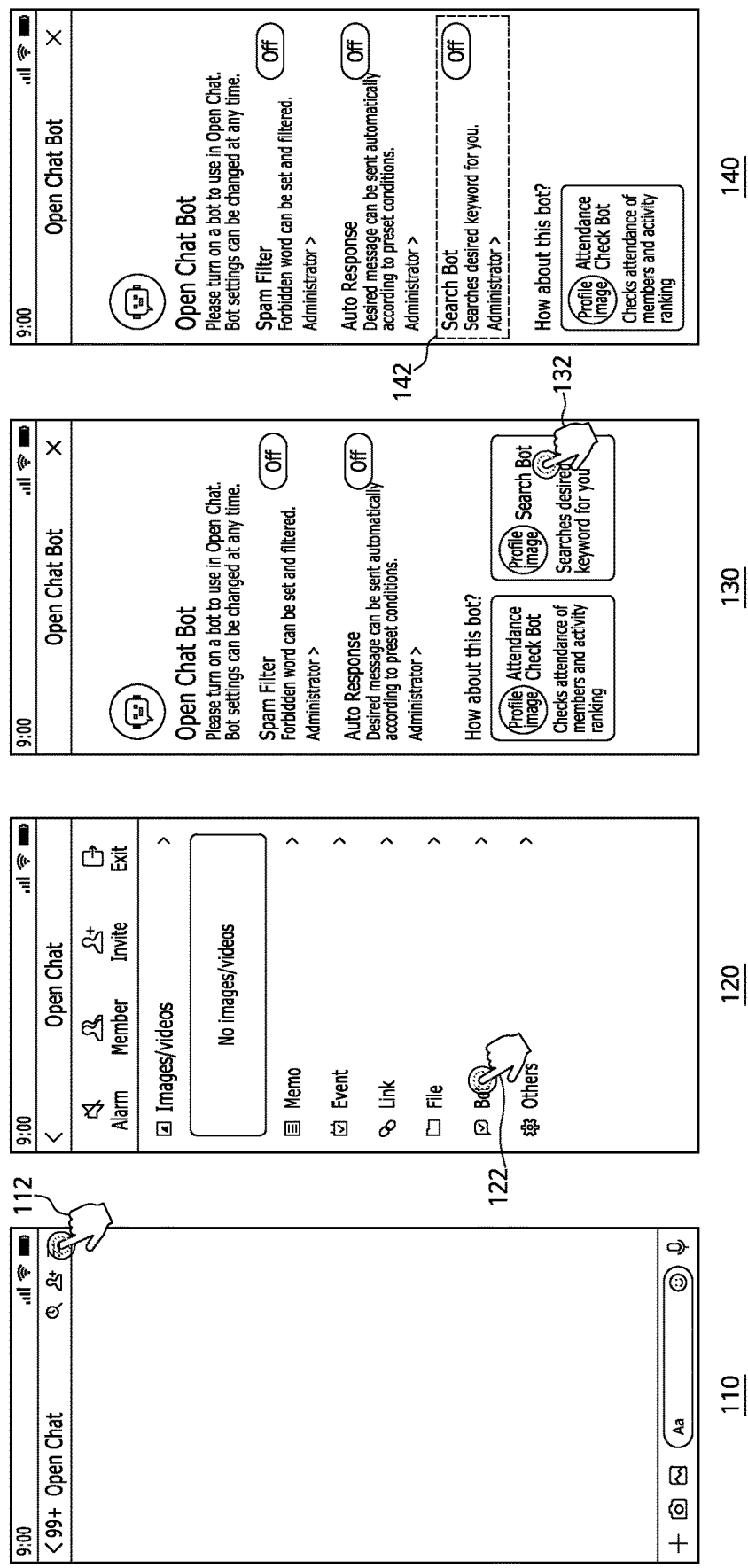
FIG. 1 illustrates an example of a method for recommending a bot for managing a chat room.

Hereinafter, example details for the practice of the present disclosure will be described in detail with reference to the accompanying drawings. However, in the following description, detailed descriptions of well-known functions or configurations may be omitted if it makes the subject matter of the present disclosure unclear.

In the accompanying drawings, the same or corresponding components are assigned the same reference numerals. In addition, in the following description of the various examples, duplicate descriptions of the same or corresponding components may be omitted. However, even if the descriptions of components are omitted, it is not intended that such components are not included in any embodiment.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the present examples are merely provided to make the present disclosure complete, and to fully disclose the scope of the disclosure to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

As used in this disclosure, a "chat room" may refer to a virtual space or group which may be generated in an instant messaging application installed on a computing device, and which may be participated by one or more users (or user accounts). For example, one or more user accounts may participate or be included in the chat room and exchange various types of messages, files, and the like. In addition, in the chat room, Voice over Internet Protocol (VoIP) call or VoIP group call function may be supported, thus enabling voice calls and/or video calls between user accounts. In addition, one or more bot accounts as well as one or more user accounts may be associated with or included in a chat room, and the bot accounts may perform the same or similar functions as the user accounts in the chat room. The bot accounts or the user accounts may be associated with or included in one or more chat rooms. In addition, the chat room may include a group chat room in which a plurality of users can participate, or an open chat room in which anyone can participate through a chat room search or link, or the like.

As used in this disclosure, the "user account" may represent an account created and used by a user in an instant messaging application or data related thereto. In addition, the user account of the instant messaging application may refer to a user who uses the instant messaging application. Likewise, a user who uses instant messaging or a user who uses a chat room capable of instant messaging may refer to the user account of the instant application.

As used in this disclosure, a "system message" may refer to a message sent by a system rather than by a user (or bot) included in the chat room. For example, in the case of a new participant entering the chat room or an existing participant leaving the chat room, a message notifying this may be displayed as a system message. The system message may be displayed such that it may be distinguished from the messages sent by the users.

As used in this disclosure, a "system" may refer to at least one of a server device and a cloud device, but not limited thereto. For example, the system may include one or more server devices. In another example, the system may include one or more cloud devices. In still another example, the system may include both the server device and the cloud device which may be operated in conjunction with each other.

As used in this disclosure, a "display" may refer to any display device associated with a computing device, and for example, it may refer to any display device that is controlled by the computing device, or that can display any information/data provided from the computing device.

As used in this disclosure, "each of a plurality of A" may refer to each of all components included in the plurality of A, or may refer to each of some of the components included in a plurality of A.

FIG. 1 illustrates an example of a method for recommending a bot for managing a chat room. A user terminal may acquire a log of a chat room including a user associated with the user terminal. The log of the chat room may refer to all or part of information stored in the user terminal, the information processing system, a database associated with the information processing system, and the like, in relation to the chat room. For example, the log of the chat room may include information on users included in the chat room, access times of the users to the chat room, contents (text, image, video, URL, file, and the like included in the messages) and send times of the message sent in the chat room, and chat room entry information and exit information (including force eject information) of the users, and other information associated with activity within the chat room.

The user terminal may analyze the acquired log of the chat room and determine whether or not a chat room bot is desirable in the chat room. For example, the user terminal may analyze whether or not abusive behavior (e.g., sending messages of inappropriate content) in the chat room is frequent, whether or not the users in the chat room have low degree of participation, whether or not specific types of content in the chat room are frequently shared, and other characteristics of activity within the chat room. Based on these types of analysis, the user terminal may determine (e.g., by certain characteristics of activity documented in the log of the chat room falling below or above a predetermined threshold) whether or not it is desirable to seek to drive a change in the characteristics of activity within the chat room (e.g., as described below by recommending one or more chat room bots).

Specifically, the user terminal may recommend a chat room bot to the user based on the analysis result of the log of the chat room. For example, the user terminal may recommend to the user at least one of: a bot for managing abusive behavior (e.g., forbidden word filter bot, force eject bot, and other bots designed to reduce the incidence of abusive behavior in the chat room); a bot for increasing a degree of user participation (e.g., attendance check bot, quiz bot, and other bots designed to elicit additional user participation); and a bot for automatically generating frequently shared content in the chat room (e.g., search bot, parsing bot, and other bots designed to promote the sharing of content typically associated with the chat room).

As illustrated in FIG. 1, the user may receive a chat room bot recommendation through first to fourth operations 110, 120, 130, and 140, and decide whether or not to apply the recommended chat room bot to the chat room. The first and second operations 110 and 120 represent examples in which the user moves from the chat room screen and enters a bot setting screen. For example, the user may enter the chat room setting screen by selecting 112 a setting button on the chat room screen by a touch input or other user interface. In addition, the user may enter the bot setting screen by selecting 122 a bot menu button on the chat room setting screen by a touch input or other user interface.

The third operation 130 represents an example in which the user selects one of the recommended chat room bots and applies it to the chat room. For example, the bot setting screen may include a list of chat room bots that are currently applied to the chat room, a list of chat room bot recommendations, and other chat room bot information, such as a list of chat room bots that are neither currently applied to the chatroom nor currently recommended. The chat bot information in presented in the bot setting screen may be interactive to change the operation of bots in the chat room. For example, as seen in operation 130 of FIG. 1, the user may select 132 a "search bot" from a list of recommended chat room bots by a touch input or other user interface to apply the search bot to the chat room.

The fourth operation 140 represents an example in which the chat room bot selected by the user is applied to the chat room. For example, the search bot 142 (after being selected by the user in operation 132) may be applied to the chat room, and the search bot 142 may be displayed as being added to the list of chat room bots currently applied to the chat room. In some arrangements, the user may select an "administrator" button of the search bot 142 from the list of chat room bots by a touch input or the like to change the detailed settings of the search bot 142, and select an "OFF" button of the search bot 142 by a touch input or other user interface to cancel applying the search bot 142.

FIG. 1 illustrates that the user enters the bot setting screen via the chat room setting screen to be provided with a chat room bot recommendation, but aspects are not limited thereto, and it may be implemented differently in some examples. For example, while selecting operations 112 and 122 are shown in FIG. 1 as separate actions, these selections may be streamlined into single action, for example, by having a dedicated selection in the chat room screen for bot setting that bypasses a general chat room setting screen. In some embodiments, the chat room bot recommendation may be displayed as a system message in the chat room screen. In this case, the user may select the system message including the chat room bot recommendation by a touch input or other user interface to enter the bot setting screen, and check the details of the recommended chat room bot on the bot setting screen or apply the recommended chat room bot to the chat room. Alternatively, the user may select the system message including the chat room bot recommendation by a touch input or user interface to directly apply the recommended chat room bot.

In addition, in the description above with reference to FIG. 1, the method for recommending a bot for managing chat rooms has been described as being performed by the user terminal, but aspects are not limited thereto, and at least some processes may be performed by other configurations. For example, a server (e.g., an information processing system) may acquire a log of a chat room, analyze the log of the chat room, and recommend a chat room bot to the user based on the analysis. In this case, the server may transmit a chat room bot recommendation to the user terminal associated with the user such that a chat room bot is recommended to the user, and the user terminal may output the received chat room bot recommendation on the display.

Figure 2:
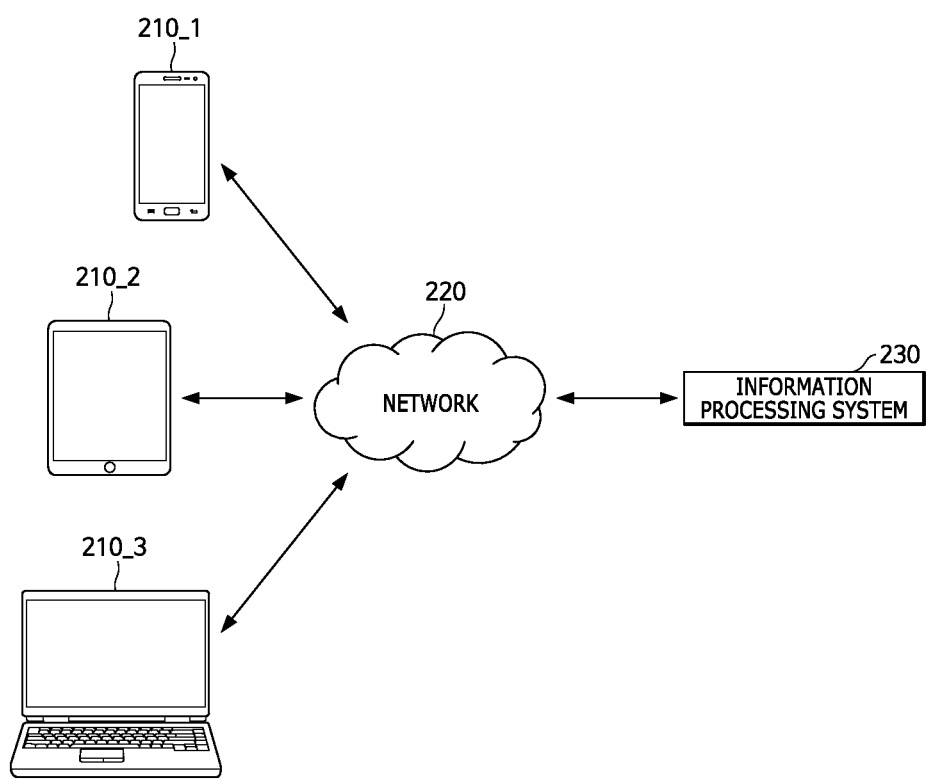
FIG. 2 schematically illustrates a configuration in which an information processing system is communicatively connected to a plurality of user terminals.

FIG. 2 schematically illustrates a configuration in which an information processing system 230 is communicatively connected to a plurality of user terminals 210_1, 210_2, and 210_3. As illustrated in FIG. 2, the plurality of user terminals 210_1, 210_2, and 210_3 may be connected to the information processing system 230 that is capable of providing an instant messaging service via a network 220. In this case, the plurality of user terminals 210_1, 210_2, and 210_3 may include terminals of the users receiving the instant messaging service. The information processing system 230 may include one or more server devices and/or databases, or one or more distributed computing devices and/or distributed databases based on cloud computing services that can store, provide and execute computer-executable programs (e.g., downloadable applications) and data relating to the provision of instant messaging services and the like.

The instant messaging service provided by the information processing system 230 may be provided to the user via instant messaging applications, web browsers, streaming platforms or other computer programs running on each of the plurality of user terminals 210_1, 210_2, and 210_3. For example, the information processing system 230 may provide information or perform a process corresponding to a request to apply a chat room bot and other requests associated with operation and management of the chatroom received from the user terminals 210_1, 210_2, and 210_3 via an instant messaging application or other computer program associated with the instant messing service.

The plurality of user terminals 210_1, 210_2, and 210_3 may communicate with the information processing system 230 via the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, other arrangement for conducting electronic communication, or a combination thereof, depending on the installation environment. The method of communication may include a communication method using a communication network (e.g., mobile communication network, wired Internet, wireless Internet, broadcasting network, satellite network) that may be included in the network 220 as well as short-range wireless communication between the user terminals 210_1, 210_2, and 210_3, but aspects are not limited thereto.

In FIG. 2, a mobile phone terminal 210_1, a tablet terminal 210_2, and a PC terminal 210_3 are illustrated as the examples of the user terminals, but aspects are not limited thereto, and the user terminals 210_1, 210_2, and 210_3 may be any computing device that is capable of wired and/or wireless communication and that can allow a user to interact with the instant messaging service. For example, the user terminal may include an artificial intelligence (AI) speaker, a smart phone, a mobile phone, a navigation, a computer, a notebook, a digital broadcasting terminal, a personal digital assistant (PDA), a portable multimedia player (PMP), a tablet PC, a game console. a wearable device, an internet of things (IoT) device, a virtual reality (VR) device, an augmented reality (AR) device, a set-top box, and other computing devices. In addition, FIG. 2 illustrates that three user terminals 210_1, 210_2, and 210_3 are in communication with the information processing system 230 via the network 220, but aspects are not limited thereto, and a different number of user terminals may be configured to be in communication with the information processing system 230 via the network 220.

The information processing system 230 may be configured to acquire a log of a chat room from the user terminals 210_1, 210_2, and 210_3. The information processing system 230 may be configured to analyze the acquired log of the chat room and transmit the chat room bot recommendations to the user terminals 210_1, 210_2, and 210_3 based on the analysis result.

Figure 3:
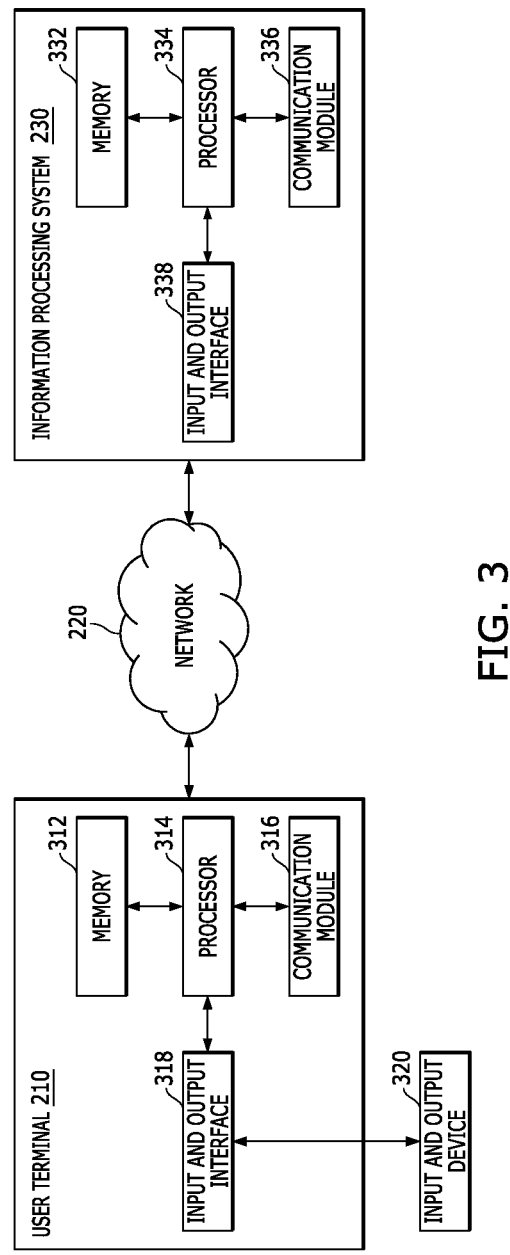
FIG. 3 is a block diagram of an internal configuration of the user terminal and the information processing system.

FIG. 3 is a block diagram of an internal configuration of the user terminal 210 and the information processing system 230. As described above, the user terminal 210 may refer to any computing device that is capable of wired/wireless communication and allows a user to interact with the instant messaging service (e.g., the mobile phone terminal 210_1, the tablet terminal 210_2, and the PC terminal 210_3 as seen in FIG. 2). As illustrated in FIG. 3, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data via the network 220 using respective communication modules 316 and 336. In addition, an input and output device 320 may be configured to input information and/or data to the user terminal 210 or to output information and/or data generated from the user terminal 210 via the input and output interface 318.

The memories 312 and 332 may include any non-transitory computer-readable recording medium. The memories 312 and 332 may include a permanent mass storage device such as random access memory (RAM), read only memory (ROM), disk drive, solid state drive (SSD), and flash memory. As another example, a non-destructive mass storage device such as ROM, SSD, flash memory, and disk drive may be included in the user terminal 210 or the information processing system 230 as a separate permanent storage device that is distinct from the memory. In addition, an operating system and at least one program code (e.g., a code for the instant messaging application, and the like installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, and a memory card, for example. As another example, the software components may be loaded into the memories 312 and 332 via the communication modules rather than the computer-readable recording medium. For example, at least one program may be loaded into the memories 312 and 332 based on a computer program installed by files provided by developers or a file distribution system that distributes an installation file of an application via the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

The communication modules 316 and 336 may provide a configuration or function for the user terminal 210 and the information processing system 230 to communicate with each other via the network 220, and may provide a configuration or function for the user terminal 210 and/or the information processing system 230 to communicate with another user terminal or another system (e.g., a separate cloud system). For example, a request or data (e.g., a request to apply a chat room bot) generated by the processor 314 of the user terminal 210 according to the program code stored in the recording device such as the memory 312 may be transmitted to the information processing system 230 via the network 220 under the control of the communication module 316. Conversely, a control signal or a command provided under the control of the processor 334 of the information processing system 230 may be received by the user terminal 210 via the communication module 316 of the user terminal 210 via the communication module 336 and the network 220. For example, the user terminal 210 may receive the chat room bot recommendation based on the analysis result of the chat room log from the information processing system 230.

The input and output interface 318 may be a means for interfacing with the input and output device 320. As an example, the input device may include a device such as a camera including an audio sensor and/or an image sensor, a keyboard, a microphone, and a mouse, and the output device may include a device such as a display, a speaker, and a haptic feedback device. As another example, the input and output interface 318 may be a means for interfacing with a device such as a touch screen or other user interface that integrates a configuration or function for performing inputting and outputting. For example, when the processor 314 of the user terminal 210 processes the instructions of the computer program loaded into the memory 312, a service screen, which is configured with the information and/or data provided by the information processing system 230 or another user terminals, may be displayed on the display via the input and output interface 318. While FIG. 3 illustrates that the input and output device 320 is not included in the user terminal 210, aspects are not limited thereto, and an input and output device may be configured as one device with the user terminal 210. In addition, the input and output interface 338 of the information processing system 230 may be a means for interfacing with a device (not illustrated) for inputting or outputting that may be connected to, or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include additional components other than those components illustrated in FIG. 3. The user terminal 210 may be implemented to include at least a part of the input and output device 320 described above. In addition, the user terminal 210 may further include other components such as a transceiver, a Global Positioning System (GPS) module, a camera, various sensors, a database, and the like. For example, if the user terminal 210 is a smartphone, it may include components generally included in a smartphone. For example, it may be implemented such that various components such as an acceleration sensor, a gyro sensor, an image sensor, a proximity sensor, a touch sensor, an illuminance sensor, a camera module, various physical buttons, buttons using a touch panel, input and output ports, and a vibrator for vibration, may be further included in the user terminal 210. The processor 314 of the user terminal 210 may be configured to operate an instant messaging application that provides, for example, the chat room bot recommendation service. A code associated with the application and/or program may be loaded into the memory 312 of the user terminal 210.

While a program for an instant messaging application or otherwise interacts with the instant messaging service and provides the chat room bot recommendation service is being operated, the processor 314 may receive text, image, video, audio, and/or action, inputted or selected via the input device such as a camera, and a microphone, and so on, that includes a touch screen, a keyboard, an audio sensor and/or an image sensor connected to the input and output interface 318, and store the received text, image, video, audio, and/or action, and so on in the memory 312, or provide the same to the information processing system 230 via the communication module 316 and the network 220. For example, the processor 314 may receive an input of a user requesting to apply a chat room bot, and provide it to the information processing system 230 via the communication module 316 and the network 220.

The processor 314 of the user terminal 210 may be configured to manage, process, and/or store the information and/or data received from the input and output device 320, another user terminal, the information processing system 230 and/or a plurality of external systems. The information and/or data processed by the processor 314 may be provided to the information processing system 230 via the communication module 316 and the network 220. The processor 314 of the user terminal 210 may transmit the information and/or data to the input and output device 320 via the input and output interface 318 to output the same. For example, the processor 314 may display the received information and/or data on a screen of the user terminal.

The processor 334 of the information processing system 230 may be configured to manage, process, and/or store information and/or data received from the plurality of user terminals 210 and/or a plurality of external systems. The information and/or data processed by the processor 334 may be provided to the user terminals 210 via the communication module 336 and the network 220.

Figure 4:
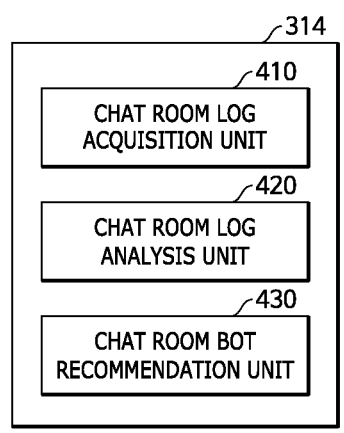
FIG. 4 is a block diagram of an internal configuration of a processor of the user terminal.

FIG. 4 is a block diagram of an internal configuration of the processor 314 of the user terminal. As illustrated, the processor 314 may include a chat room log acquisition unit 410, a chat room log analysis unit 420, a chat room bot recommendation unit 430, and other components associated with management or operation of the chat room. The chat room log acquisition unit 410 may, for example, acquire a log of a chat room to be analyzed. The log of the chat room may refer to all or part of information stored in the user terminal, the information processing system, the database associated with the information processing system, and other computer systems, in relation to the chat room. For example, the log of the chat room may include information on users included in the chat room, access times of the users to the chat room, contents (e.g., text, image, video, URL, file, and other data included in the messages of the chat room), send times of the message sent in the chat room, chat room entry information of the users, and chat room exit information (including force eject information) of the users. The chat room log acquisition unit 410 may select and extract, from the logs of the chat room, only the log information that is required for analysis, or select and extract only the log information for a predetermined period of time to be analyzed (e.g., 3 months).

The chat room log analysis unit 420 may analyze the log information acquired by the chat room log acquisition unit 410 to determine if a chat room bot is desirable in the chat room, the type of chat room bot that is desirable, and other determinations related to recommending one or more chat room bots. For example, the chat room log analysis unit 420 may detect abusive behavior in the chat room such as, for example, the sending of a message that includes a forbidden word (e.g., a curse word, an epithet, or other type of offensive language) within a first predetermined period of time (e.g., within the last 3 months). In this case, the forbidden word may include a plurality of texts predefined by, for example, a service administrator and/or a user.

As a specific example of analyzing the abusive behavior, the chat room log analysis unit 420 may calculate, among the messages sent from the chat room within the first predetermined period of time, the number of messages including forbidden words, and determine whether or not the number of messages including forbidden word is equal to or greater than a first threshold (e.g., 30), thereby determining whether or not a bot to manage is desirable for the frequent sending of inappropriate messages in the chat room. The value of the first threshold may vary depending on characteristics of the chatroom (e.g., whether the chat room is associated with content intended for adults or for children). As another example, the chat room log analysis unit 420 may calculate, among the participants who sent the message including forbidden word within the first predetermined period of time, the number or proportion of the participants who are force ejected from the chat room, and determine whether or not the number of force ejected participants is equal to or greater than a second threshold (e.g., 5), or whether or not a proportion of the force ejected participants is equal to or greater than a third threshold (e.g., 30%), thereby determining whether or not a bot to manage is required for the frequent force ejection of abusers from the chat room.

Additionally or alternatively, the chat room log analysis unit 420 may analyze not only forbidden words in a message, but also images (e.g., with graphic or offensive content), URLs (e.g., with links to malicious or offensive websites), and other undesirable content (e.g., spam) sent in the chat room. Additionally or Alternatively, the chat room log analysis may identify malicious bots that are deceptively impersonating a human user in the chat room.

Accordingly, analysis by the chat room log analysis unit 420 may determine whether or not an abusive behavior occurs frequently in the chat room. As examples, the chat room log analysis unit 420 may (i) use a image analysis model to determine whether or not an image sent from the chat room is an inappropriate image (e.g., an image determined as a spam image, or an obscene image by the image analysis model), and (ii) analyze the length of the redirection chain of the URL to determine whether or not the URL is an inappropriate URL (e.g., a URL in which the number of redirects is more than a predetermined number). In addition, the chat room log analysis unit 420 may calculate the number of times an inappropriate image or URL is sent in the chat room, the number or proportion of participants who were force ejected after sending the inappropriate image or URL, the number or proportion of participants who were malicious bots impersonating a human user, and the number of other incidents of abusive behavior, thereby determining whether or not a bot to manage an abusive behavior is desirable in order to attempt to reduce the frequent occurrence of abusive behaviors in the chat room.

Additionally or alternatively, the chat room log analysis unit 420 may analyze the degree of participation of the participants in the chat room within a second predetermined period of time (e.g., within the last one week, 3 months; the second predetermined period of time may be of the same or different duration than the first predetermined period of time), thereby determining whether or not a bot to increase the degree of participation of participants is required for the low degree of participation in the chat room. For example, the chat room log analysis unit 420 may determine a participation rate of the chat room (e.g., the number of participants who have sent at least one message within the last 3 months compared to the total number of participants), based on the total number of participants in the chat room and the number of participants who sent at least a fourth threshold (e.g., one) of message(s) within the second predetermined period of time, thereby determining whether or not the participation rate of the chat room is equal to or less than a fifth threshold. In this case, the fifth threshold may be determined based on an average participation rate of all chat rooms (e.g., all chat rooms on instant messaging application, all group chat rooms on instant messaging application, all open chat rooms on instant messaging application, or all chat rooms including users). For example, the fifth threshold may be determined to be 50% of the average participation rate of all chat rooms within the last 3 months. As another example of analyzing the degree of participation of participants in the chat room, the chat room log analysis unit 420 may calculate the number of messages sent in the chat room within the second predetermined period of time, and determine whether or not the number of messages sent in the chat room is equal to or less than a sixth threshold. In this case, the sixth threshold may be determined based on the average number of messages in all chat rooms. For example, the sixth threshold may be determined to be 50% of the average number of messages in all chat rooms within the last 3 months.

Additionally or alternatively, the chat room log analysis unit 420 may analyze a specific keyword or URL included in a message in the chat room within a fourth predetermined period of time (e.g., the last one month, the last 3 months; the fourth predetermined period of time may be of the same or different duration than the first and/or second predetermined period of time) to determine whether or not a bot for automatically generating a specific type of content is required for the frequent sharing of the same in the chat room. For example, in order to analyze the keywords repeatedly sent in the chat room within the fourth predetermined period of time, the chat room log analysis unit 420 may calculate the number of times a specific keyword is sent, and determine whether or not the number of times the specific keyword is sent is equal to or greater than a seventh threshold (e.g., 30 times). As another example, the chat room log analysis unit 420 may determine whether or not there is a repeatedly shared URL pattern in the chat room within the fourth predetermined period of time, and if determining that there is the repeatedly shared URL pattern, calculate the number of times the corresponding URL pattern is sent, and determine whether or not the calculated number of times sending is equal to or greater than an eighth threshold (e.g., 20 times).

The chat room bot recommendation unit 430 may recommend a chat room bot to the user based on the analysis result by the chat room log analysis unit 420. Based on the analysis result of the abusive behavior in the chat room, the chat room bot recommendation unit 430 may recommend a forbidden word filter bot that performs a function of automatically managing a message including forbidden word (or similarly a message including an inappropriate image, an inappropriate URL, and/or other undesirable content), a force eject bot that performs a function of automatically managing a participant who (i) sent a message including forbidden word N or more times (e.g., 2 or more times), and/or (ii) is determined to be a malicious bot impersonating a human user. For example, if it is determined that the number of times a message including forbidden word is sent in the chat room within the first predetermined period of time is equal to or greater than the first threshold, the chat room bot recommendation unit 430 may recommend a forbidden word filter bot to the user. As another example, if it is determined that the proportion of participants who were force ejected from the chat room after sending a message including a forbidden word from the chat room within the first predetermined period of time is equal to or greater than the second threshold, or if it is determined that the number of force ejected participants from the chat room is equal to or greater than the third threshold, the chat room bot recommendation unit 430 may recommend a force eject bot to the user. Similarly, if it is determined that a certain number of users are malicious bots impersonating human users, the chat room bot recommendation unit 430 may also recommend a force eject bot to the user Additionally or alternatively, the chat room bot recommendation unit 430 may recommend a chat room bot that performs a function of increasing the degree of participation of the participants in the chat room, based on the analysis result of the degree of participation of the participants in the chat room. For example, if it is determined that the participation rate of the chat room within the second predetermined period of time is equal to or less than the fifth threshold, the chat room bot recommendation unit 430 may recommend an attendance check bot to the user. The attendance check bot may perform a function of increasing the degree of participation of participants by notifying the list of participants who accessed the chat room within a third predetermined period of time (e.g., in a day; the third predetermined period of time may be of the same or different duration than the first, second and/or fourth predetermined period of time), the ranking of the degrees of participation of participants in the chat room within the third predetermined period of time. As another example, if it is determined that the number of messages sent in the chat room within the second predetermined period of time is equal to or less than the sixth threshold, the chat room bot recommendation unit 430 may recommend a quiz bot to the user. The quiz bot may perform a function of increasing the degree of participation of participants by giving a quiz and providing a reward to the participant who answers the quiz.

Additionally or alternatively, the chat room bot recommendation unit 430 may recommend a bot that performs a function of automatically generating frequently shared content in the chat room, based on a specific keyword or URL analysis result included in the message in the chat room. For example, if it is determined that the number of times the specific keyword is sent within the fourth predetermined period of time is equal to or greater than the seventh threshold, the chat room bot recommendation unit 430 may recommend a search bot to the user. The search bot may perform a function of automatically providing search results for the specific keyword. The search bot may be implemented in a variety of ways. For example, the search bot may be implemented such that it automatically provides a search result for a specific keyword (e.g., real-time search results for "Company A stock price"), in response to sensing a message including the specific keyword (e.g., "Company A stock price") in the chat room. As another example, the search bot may be implemented such that it automatically provides real-time search results for the specific keyword at predetermined time intervals (e.g., every hour). As another example, the search bot may be implemented such that it automatically provides search results for the specific keyword, in response to sensing a message including both a predetermined instruction (e.g., "#") and a specific keyword in the chat room. As another example of recommending the bot that performs the function of automatically generating frequently shared content in the chat room, the chat room bot recommendation unit 430 may recommend a parsing bot to the user, if it is determined that the number of times the URL pattern is repeatedly sent in the chat room within the fourth predetermined period of time is equal to or greater than the eighth threshold. The parsing bot may perform a function of automatically sending a URL with updated parameter to the chat room, in response to determining that the parameter of the URL pattern is updated.

The internal configuration of the processor 314 illustrated in FIG. 4 is only an example, and in some examples, configurations other than the illustrated internal configuration may be additionally included, and some configurations may be omitted. In addition, at least a part of the internal configuration of the processor 314 illustrated in FIG. 4 may be included in the processor 334 of the information processing system.

Although the internal components of the processor 314 have been described separately for each function in FIG. 4, this does not necessarily mean that they are physically separated and may instead be incorporated into a single structure. Although the chat room log acquisition unit 410, the chat room log analysis unit 420, and the chat room bot recommendation unit 430 have been separately described above, this is to help the understanding of the present disclosure, and aspects are not limited thereto.

Figure 5:
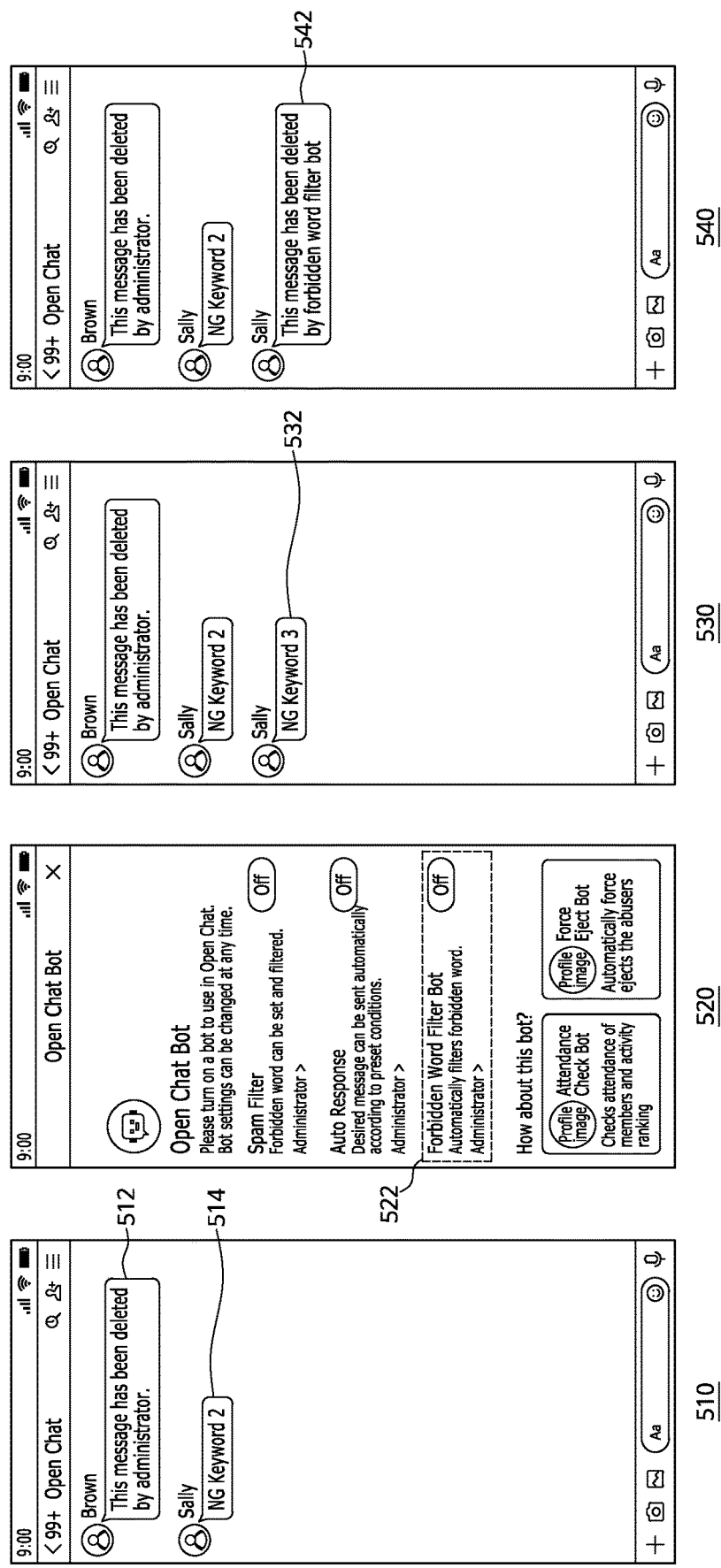
FIG. 5 illustrates an example of recommending a forbidden word filter bot.

FIG. 5 illustrates an example of recommending a forbidden word filter bot. As illustrated in FIG. 5, the user may receive a recommendation for a forbidden word filter bot via first to fourth operations 510, 520, 530, and 540 and apply the forbidden word filter bot to the chat room to use the same. The first operation 510 represents an example in which a message including forbidden word is sent in the chat room. For example, a message 512 sent by the user "Brown" is the message including forbidden word, which has been manually deleted by the administrator of the chat room. Accordingly, for the message 512 sent by the user "Brown", a phrase "The message has been deleted by the administrator" is displayed instead of the message content sent by the user "Brown". In addition, a message 514 sent by the user "Sally" is a message including forbidden word (NG keyword 2 in FIG. 5), and has not been deleted by the administrator, and the administrator may select the corresponding message 514 by long touch input and the like, so as to delete the message including forbidden word.

For a large chat room, it may take a lot of resources for the administrator to directly sense and delete messages including forbidden words. Accordingly, the processor (e.g., the processor of the user terminal or the processor of the information processing system) may recommend the forbidden word filter bot to the user (e.g., the administrator of the chat room) of the chat room in which the message including forbidden word is frequently sent. For example, the processor may sense that forbidden words have been sent more than 30 times in the chat room within the last 3 months, and recommend the forbidden word filter bot to the administrator of the chat room.

The second operation 520 represents an example in which the user receives a recommendation of a forbidden word filter bot 522 and applies the forbidden word filter bot 522 to the chat room. For example, the forbidden word filter bot 522 may be displayed in the list of chat room bots being applied in the bot setting screen.

The third operation 530 represents an example in which a message including forbidden word is sent in the chat room after the forbidden word filter bot is applied. For example, a message 532 including a forbidden word (NG keyword 3 in FIG. 5) may be sent by the user "Sally" in the chat room.

The fourth operation 540 represents an example in which the forbidden word filter bot automatically deletes the message including forbidden word. For example, the forbidden word filter bot may sense that the message 532 including forbidden word was sent and, in response, delete the corresponding message 532 immediately. After the message including forbidden word is deleted, in the corresponding message, a phrase 542 indicating that the message was deleted by the forbidden word filter bot (e.g., "The message has been deleted by the forbidden word filter bot" in FIG. 5) may be displayed instead of the sent message content.

While FIG. 5 illustrates that the content of the message 532 including forbidden word is displayed on the chat room screen and then deleted, this is to show an example in which a message including forbidden word is deleted by the forbidden word filter bot, and in some examples, the content of the message 532 including forbidden word may be immediately indicated to have been deleted by the forbidden word filter bot, rather than being displayed on the chat room screen.

Figure 6:
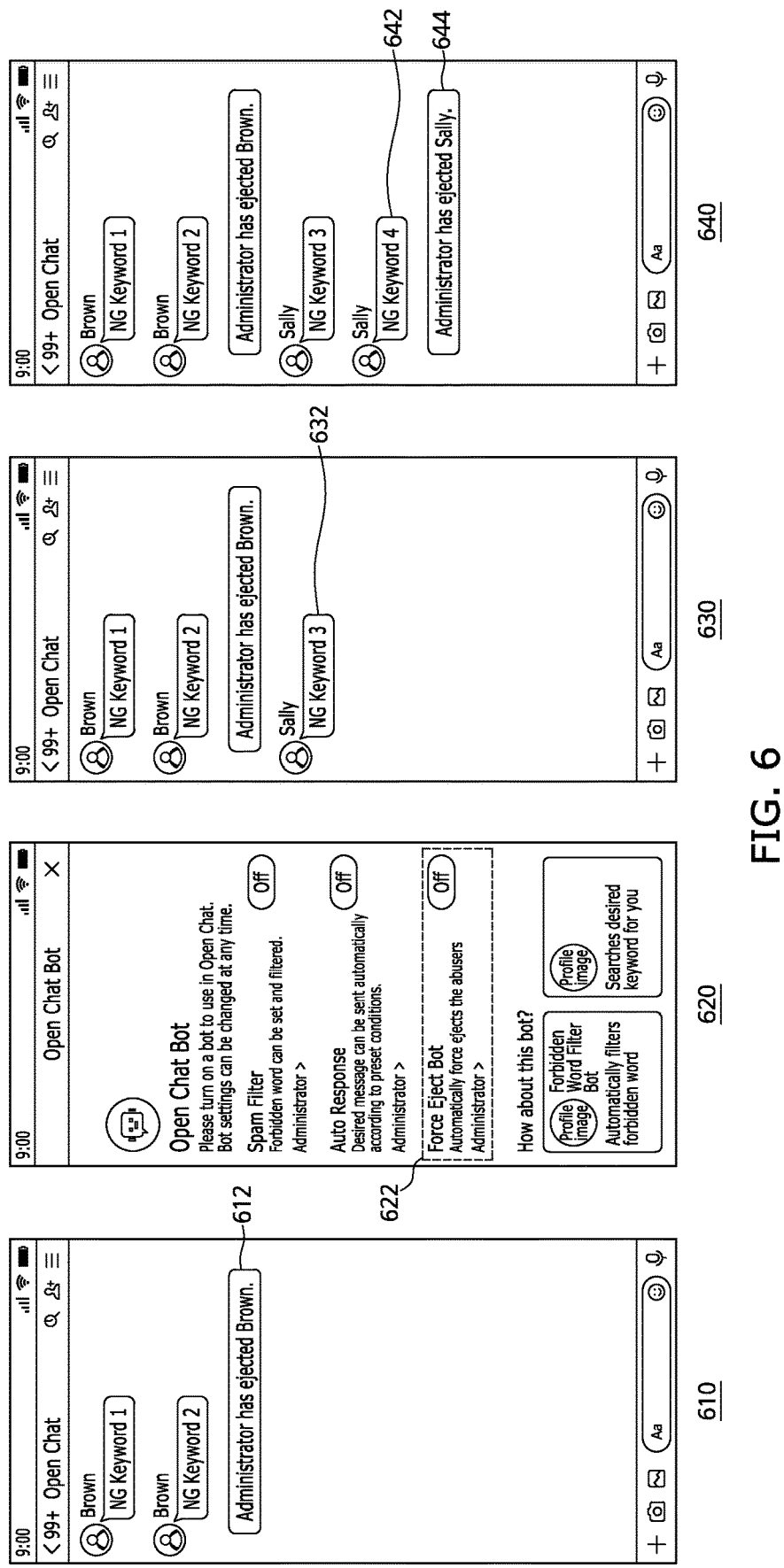
FIG. 6 illustrates an example of recommending a force eject bot.

FIG. 6 illustrates an example of recommending a force eject bot. As illustrated, the user may receive a recommendation for the force eject bot via first to fourth operations 610, 620, 630, and 640 and apply the force eject bot to the chat room to use the same. The first operation 610 represents an example in which a user who sent a message including forbidden word in the chat room is force ejected. For example, the user "Brown" has been manually force ejected by the administrator of the chat room, because he repeatedly sent messages including forbidden word. Accordingly, a system message 612 is displayed, indicating that the user "Brown" has been force ejected by the administrator. For a large chat room, it may take a lot of resources for the administrator to directly monitor the abusive behaviors of the chat room participants and force eject the participants for their repeated abusive behaviors. Accordingly, the processor (e.g., the processor of the user terminal or the processor of the information processing system) may recommend the force eject bot to the user of the chat room (e.g., the administrator of the chat room) that has the number or proportion of force ejected users due to abusive behavior exceeding a threshold value. For example, the processor may sense that five or more users were force ejected for sending forbidden words in the chat room within the last 3 months, and may recommend the force eject bot to the administrator of the chat room.

The second operation 620 represents an example in which the user is recommended with a force eject bot 622 and applies the force eject bot 622 to the chat room. For example, the force eject bot 622 (force eject bot in FIG. 6) may be displayed in the list of chat room bots being applied in the bot setting screen.

The third operation 630 represents an example in which a message including forbidden word is sent in the chat room after the force eject bot is applied. For example, a message 632 including forbidden word (NG keyword 3 in FIG. 6) is sent in the chat room by the user "Sally". The force eject bot may send a warning message to the user who sent a message including forbidden word N times (e.g., once) or more. Accordingly, the force eject bot may send a warning message (e.g., a message saying "You have used the forbidden word once. If you use the forbidden word once more, you may be force ejected from the chat room.") to the user "Sally" who sent the message including forbidden word once.

The fourth operation 640 represents an example in which the force eject bot force ejects the user who sent a message including forbidden word. For example, the force eject bot may force eject a user who sent a message including forbidden word M times or more (M>N, for example, 2 times). The force eject bot may sense that a message 642 including forbidden word (NG keyword 4 in FIG. 6) is sent for the second time by the user "Sally", and in response to this, may automatically force eject the user "Sally". When a user is force ejected by the force eject bot, a system message 644 (e.g., "Force eject bot ejected Sally" in FIG. 6) informing of this may be displayed in the chat room.

Figure 7:
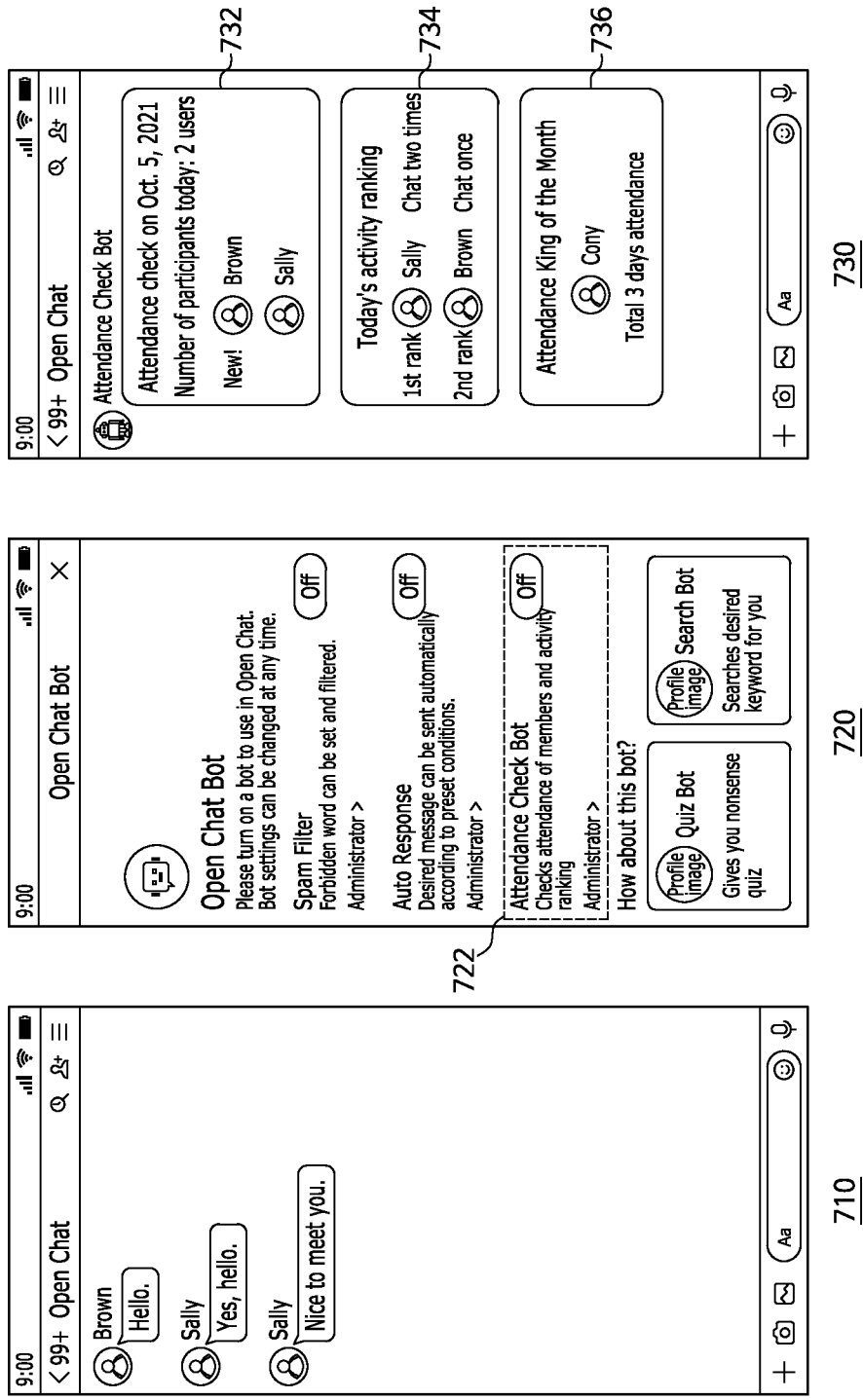
FIG. 7 illustrates an example of recommending an attendance check bot.

FIG. 7 illustrates an example of recommending an attendance check bot. As illustrated, the user may receive a recommendation for the attendance check bot through first to third operations 710, 720, and 730 and apply the attendance check bot to the chat room to use the same. The first operation 710 represents an example of a chat room having a low participation rate. For example, although 100 or more users are included in the illustrated chat room, the number of participants who sent one or more messages within the last 3 months may be 10 or less. That is, the participation rate may be equal to or less than 10%. This may be 50% or less of the average participation rate (e.g., 30%) of all chat rooms. Accordingly, the processor (e.g., the processor of the user terminal or the processor of the information processing system) may recommend the attendance check bot to the user of the chat room (e.g., the administrator of the chat room) to increase degree of participation in the chat room.

The second operation 720 represents an example in which the user receives a recommendation for an attendance check bot 722 and applies the attendance check bot 722 to the chat room. For example, the attendance check bot 722 may be displayed in the list of chat room bots being applied in the bot setting screen.

The third operation 730 represents an example in which the attendance check bot notifies a list of participants who accessed the chat room within a predetermined period of time or the ranking of the degrees of participation of participants in the chat room within a predetermined period of time. For example, the attendance check bot may notify a list 732 of participants who accessed the chat room in a day, the ranking 734 of the number of message transmissions by the participants in a day, and a participant 736 who accessed the chat room the most often in the current month, so as to motivate the participants to participate in the chat room.

Figure 8:
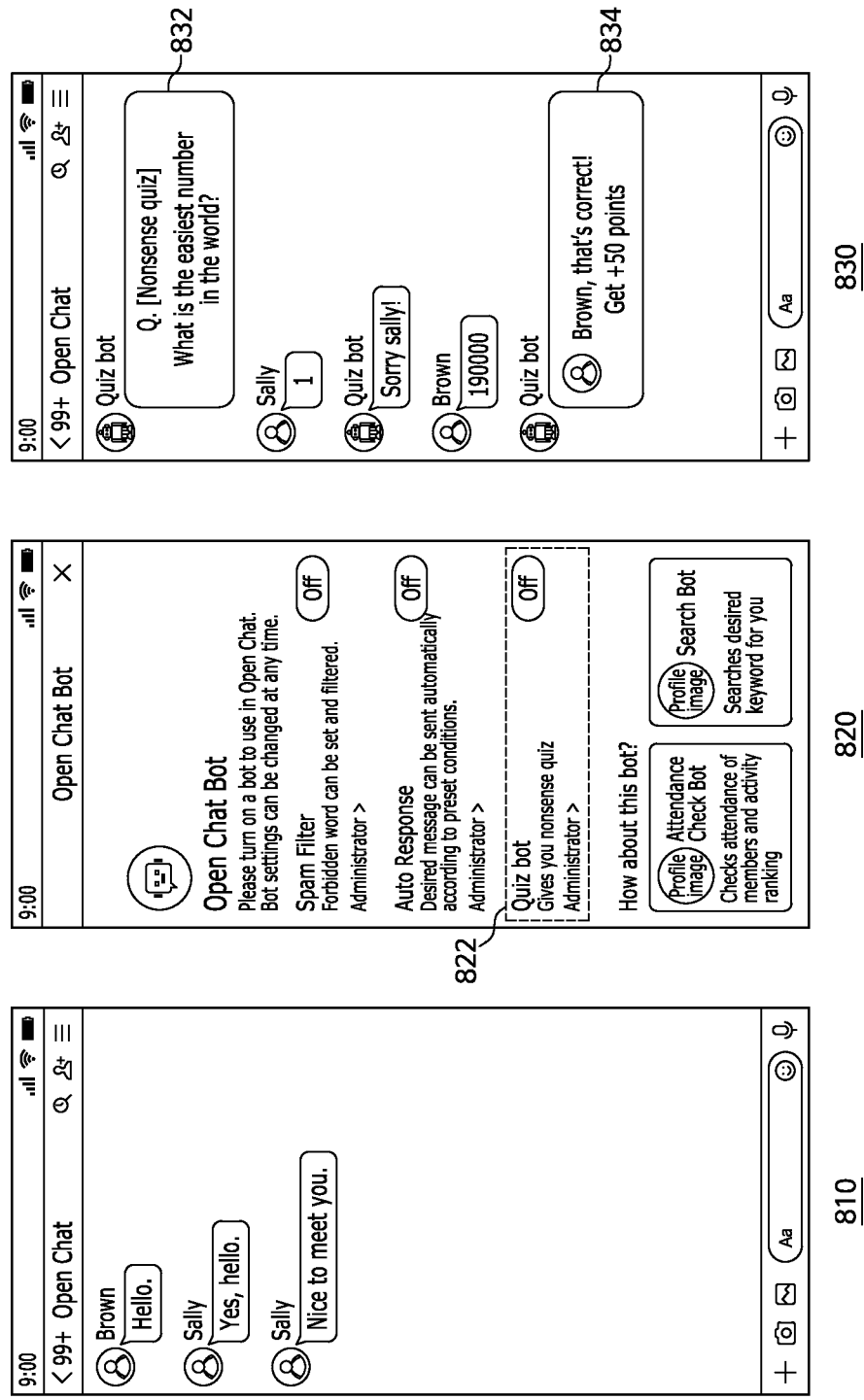
FIG. 8 illustrates an example of recommending a quiz bot.

FIG. 8 illustrates an example of recommending a quiz bot. As illustrated, the user can receive a quiz bot recommendation via first to third operations 810, 820, and 830 and apply the quiz bot to the chat room to use the same. The first operation 810 represents an example of a chat room having a low participation rate. For example, in the illustrated chat room, the number of messages sent within the last 3 months may be 30. This may be 50% or less of the average number of messages in all chat rooms (e.g., 100 messages in the last 3 months on average). Accordingly, the processor (e.g., the processor of the user terminal or the processor of the information processing system) may recommend the quiz bot to the user of the chat room (e.g., the administrator of the chat room) to increase degree of participation in the chat room.

The second operation 820 represents an example in which the user receives a recommendation of a quiz bot 822 and applies the quiz bot 822 to the chat room. For example, the quiz bot 822 may be displayed in the list of chat room bots being applied in the bot setting screen.

The third operation 830 represents an example in which the quiz bot gives a quiz and provides a reward to a participant who answers the quiz. For example, the quiz bot may give a nonsense quiz 832 and grant points that are rewards 834 to the participant "Brown" who answers the quiz to motivate the participants to participate in the chat room.

Figure 9:
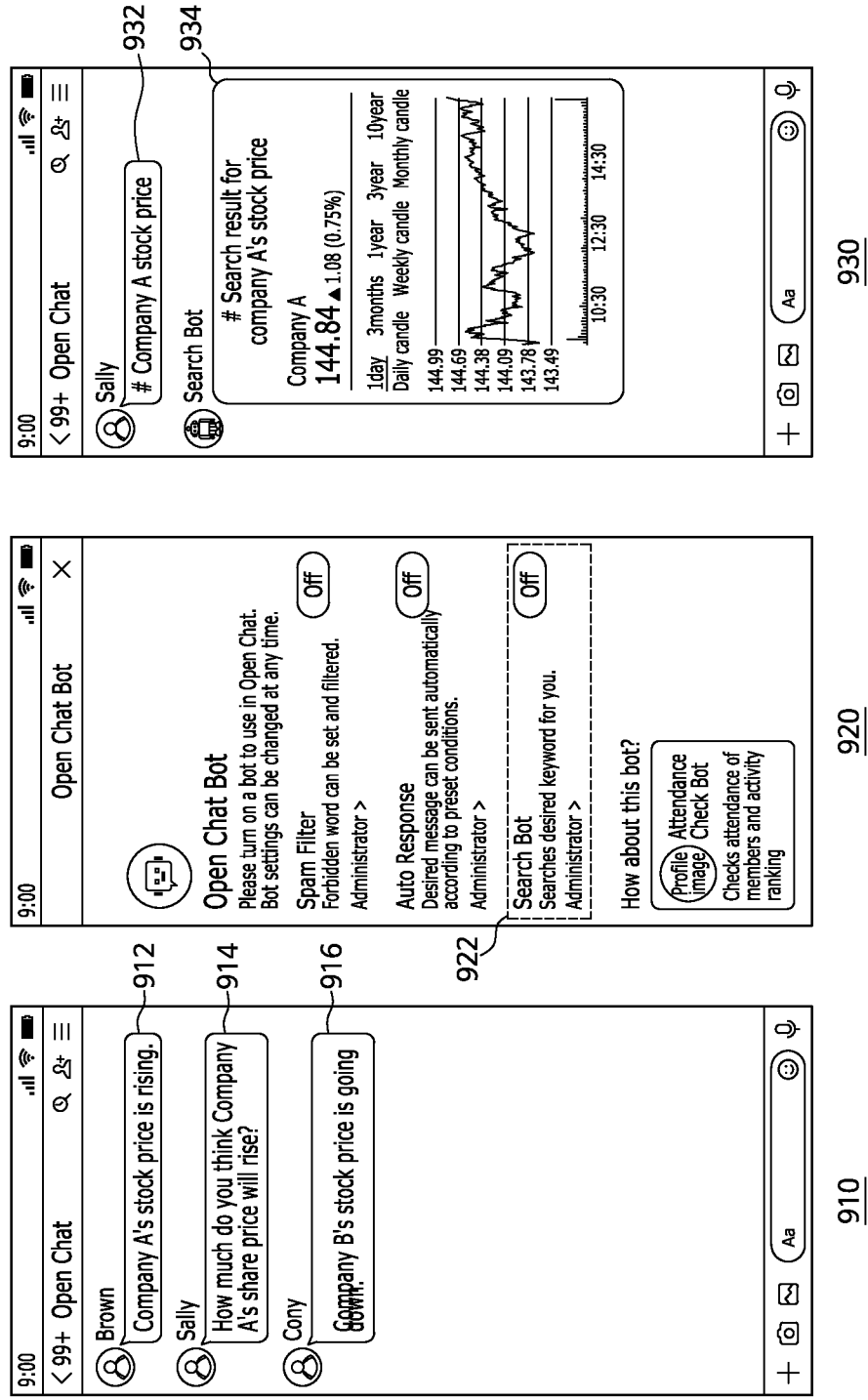
FIG. 9 illustrates an example of recommending a search bot.

FIG. 9 illustrates an example of recommending a search bot. As illustrated, the user may receive a recommendation for a search bot via first to third operations 910, 920, and 930 and apply the search bot to the chat room to use the same. The first operation 910 represents an example of the chat room in which a specific keyword is frequently sent. For example, two (e.g., messages 912 and 914) of three messages 912, 914, and 916 displayed on the chat room screen include the keyword "Company A stock price". That is, in the illustrated chat room, the keyword "Company A stock price" is frequently shared, and the keyword may be a common interest of the participants in the chat room. The processor (e.g., the processor of the user terminal or the processor of the information processing system) may determine that the number of times the keyword "Company A's stock price" is sent in the chat room within the last 3 months is 30 or more, and recommend a search bot to the user (e.g., the administrator of the chat room).

The second operation 920 represents an example in which the user receives a recommendation of a search bot 922 and applies the search bot 922 to the chat room. For example, the search bot 922 may be displayed in the list of chat room bots being applied in the bot setting screen.

The third operation 930 represents an example in which the search bot provides a search result for a specific keyword. For example, the search bot may sense that a message 932 including both a pre-specified command ("#" in FIG. 9) and "Company A stock price" is sent, and provide a real-time search result 934 for "Company A stock price". In FIG. 9, it is illustrated that the search bot provides a search result for a specific keyword in response to sending a message including both a predetermined command and a specific keyword, but aspects are not limited thereto, and the search bot may be implemented in various ways. For example, the search bot may be implemented such that it automatically provides real-time search results for "Company A stock price" in response to sensing a message including "Company A stock price" without a predetermined command, or may be implemented such that it automatically provides real-time search results for "Company A stock price" at predetermined time intervals (e.g., every hour).

Figure 10:
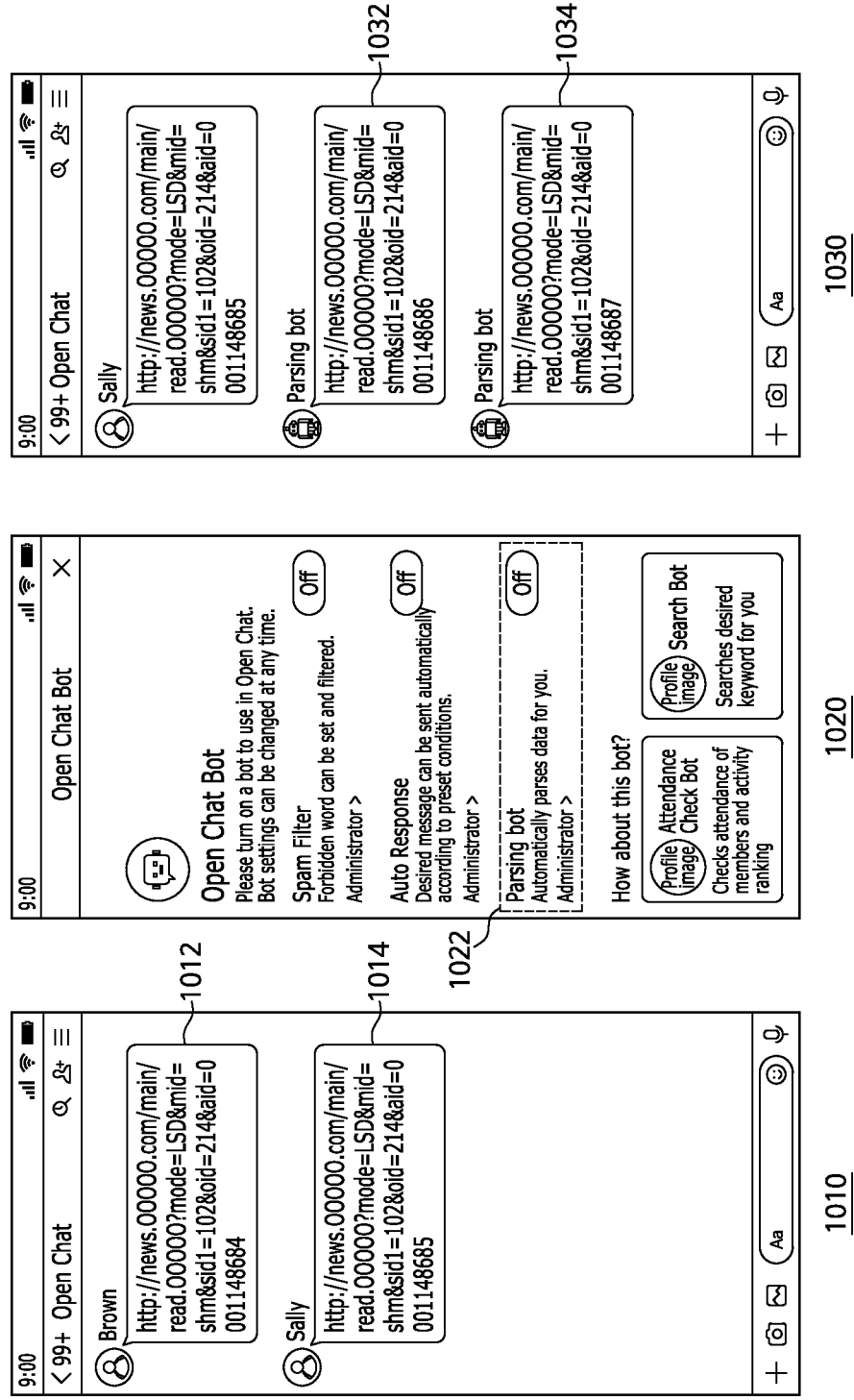
FIG. 10 illustrates an example of recommending a parsing bot.

FIG. 10 illustrates an example of recommending a parsing bot. As illustrated, the user may receive a parsing bot recommendation via first to third actions 1010, 1020, and 1030 and apply the parsing bot to the chat room to use the same. The first operation 1010 represents an example of the chat room in which a specific URL pattern is frequently sent.

For example, it can be seen that the URLs included in two messages 1012 and 1014 displayed on the chat room screen all have a pattern of "http[colon]//news[dot]OOOOO[dot] com/main/read[dot]OOOOO?mode=LSD&mid=shm&sid". That is, in the illustrated chat room, a specific URL pattern is frequently shared, and content included in the URL of the pattern may be a common interest of participants in the chat room. However, it may take a lot of resources for the user to directly monitor whether or not the parameters of the URL of a specific pattern are updated and share the URL with the updated parameters in the chat room whenever the parameters are updated. Accordingly, the processor (e.g., the processor of the user terminal or the processor of the information processing system) may sense that a specific URL pattern "http[colon]//news[dot]OOOOO[dot]com/ main/read[dot]OOOOO?mode=LSD&mid=shm&sid" was sent 20 or more times in the chat room within the last 3 months, and recommend a parsing bot to the user (e.g., the chat room administrator).

The second operation 1020 represents an example in which the user receives a recommendation of a parsing bot 1022 and applies the parsing bot 1022 to the chat room. For example, the parsing bot 1022 may be displayed in the list of chat room bots being applied in the bot setting screen.

The third operation 1030 represents an example in which the parsing bot automatically sends the URL. For example, the parsing bot may sense in real time that the parameter of the URL pattern "http://news. OOOOO.com/main/ read.OOOOO?mode=LSD&mid=shm&sid" has been updated (In FIG. 10, pages with parameter 'aid' of '0001148686' and '0001148687' are generated), and in response to the parameter update, may share URLs 1032 and 1034 having the updated parameter to the chat room.

Figure 11:
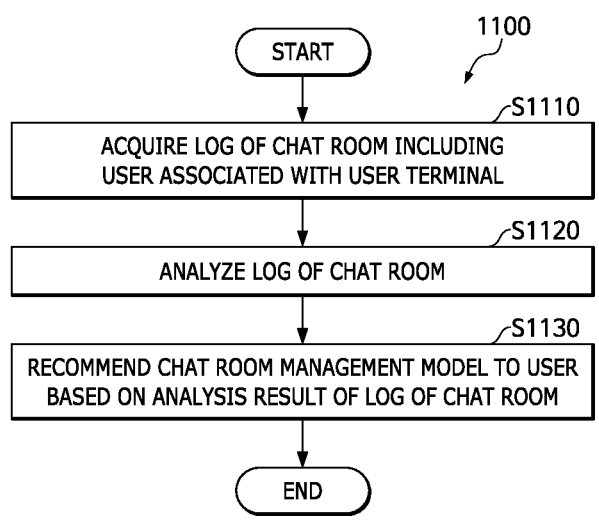
FIG. 11 is a flowchart illustrating a method for recommending a bot for managing a chat room.

FIG. 11 is a flowchart illustrating a method 1100 for recommending a bot for managing a chat room. The method 1100 may be initiated by a processor (e.g., the processor of the user terminal or the processor of the information processing system) acquiring a log of a chat room including a user associated with the user terminal, at S1110. In this case, the log of the chat room may refer to all or part of the information stored in the user terminal, the information processing system, the database associated with the information processing system, and other computer systems in relation to the chat room. For example, the log of the chat room may include information on users included in the chat room, access time of the users to the chat room, contents (e.g., text, image, video, URL, file, and other data included in the messages of the chat room), send time of the message sent in the chat room, chat room entry information of the users, and chat room exit information (including force eject information) of the users.

The processor may analyze the log of the chat room, at S1120. The processor may analyze a message including a forbidden word among the messages in the chat room within a first predetermined period of time (e.g., the last 3 months). The forbidden word may include a plurality of texts predefined by at least one of a service administrator or a user. As a specific example of analyzing the message including a forbidden word, the processor may calculate the number of messages including the forbidden words among the messages in the chat room within the first predetermined period of time, and determine whether or not the number of messages including forbidden word is equal to or greater than a first threshold (e.g., 30), thereby determining whether or not a bot to manage is required for the frequent sending of inappropriate messages in the chat room. As another example, the processor may calculate, among the participants who sent the message including forbidden word among the messages in the chat room within the first predetermined period of time, the number or proportion of the participants who were force ejected from the chat room, and determine whether or not the number of force ejected participants is equal to or greater than a second threshold (e.g., 20) or whether or not a proportion of the force ejected participants is equal to or greater than a third threshold (e.g., 30%), thereby determining whether or not a bot is required to manage the frequent force ejection of abusers from the chat room.

Additionally or alternatively, the processor may analyze the degree of participation of the participants in the chat room within the second predetermined period of time (e.g., the last 3 months), thereby determining whether or not a bot for increasing degree of participation is required for a low degree of participation in the chat room. For example, the processor may determine the participation rate of the chat room (e.g., the number of participants who have sent at least one message within the last 3 months compared to the total number of participants) based on the total number of participants in the chat room and the number of participants who sent at least a fourth threshold (e.g., one) of message(s) within the second predetermined period of time, thereby determining whether or not the participation rate of the chat room is equal to or less than the fifth threshold. In this case, the fifth threshold may be determined based on the average participation rate of all chat rooms (e.g., all chat rooms on instant messaging application, all group chat rooms on instant messaging application, all open chat rooms on instant messaging application, or all chat rooms including users). For example, the fifth threshold may be 50% of the average participation rate of all chat rooms within the last 3 months. As another example, the processor may calculate the number of messages sent in the chat room within the second predetermined period of time, and determine whether or not the number of messages sent in the chat room is equal to or less than the sixth threshold. In this case, the sixth threshold may be determined based on the average number of messages in all chat rooms (e.g., the sixth threshold is 50% of the average number of messages in all chat rooms within the last 3 months).

Additionally or alternatively, the processor may analyze a specific keyword or URL included in a message in the chat room within the fourth predetermined period of time (e.g., the last 3 months) to determine whether or not a bot for automatically generating a specific type of content is required for the frequent sharing of the same in the chat room. For example, the processor may calculate the number of times the specific keyword included in the message is sent in the chat room within the fourth predetermined period of time, and determine whether or not the number of times the specific keyword is sent is equal to or greater than the seventh threshold (e.g., 30 times). As another example, in response to determining that there is the URL pattern repeatedly included in the message in the chat room within the fourth predetermined period of time, the processor may calculate the number of times the URL pattern is sent, and determine whether or not the calculated number of times is equal to or greater than the eighth threshold (e.g., 20 times).

The processor may recommend the chat room bot to the user based on the analysis result of the log of the chat room, at S1130. The recommendation of the chat room bot may be displayed on the display of the user terminal, such as being displayed as a system message in the chat room, such that the user can recognize the recommendation of the chat room bot. The processor may recommend at least one of (i) a forbidden word filter bot that performs a function of automatically managing a message including forbidden word, and (ii) a force eject bot that performs a function of automatically managing a participant who sent the message including a forbidden word, based on the analysis result of the message including the forbidden word. For example, the processor may recommend the forbidden word filter bot to the user in response to determining that the number of messages including a forbidden word is equal to or greater than the first threshold. As another example, in response to determining that the proportion of participants force ejected from the chat room is equal to or greater than the second threshold or in response to determining that the number of force ejected participants from the chat room is equal to or greater than the third threshold, the processor may recommend the force eject bot to the user.

Additionally or alternatively, the processor may recommend a chat room bot that performs a function of increasing the degree of participation of the participants in the chat room, based on the analysis result of the degree of participation of the participants in the chat room. For example, in response to determining that the participation rate of the chat room is equal to or less than the fifth threshold, the processor may recommend an attendance check bot to the user. The attendance check bot may perform a function of notifying a list of participants who accessed the chat room within a third predetermined period of time or the ranking of the degrees of participation of the participants in the chat room within the third predetermined period of time. As another example, in response to determining that the number of messages sent in the chat room is equal to or less than the sixth threshold, the processor may recommend a quiz bot to the user. The quiz bot may perform a function of giving a quiz and providing a reward to the participant who answers the quiz.

Additionally or alternatively, the processor may recommend a bot that performs a function of automatically generating frequently shared content in the chat room based on a specific keyword or URL analysis result included in the message in the chat room. For example, in response to determining that the number of times a specific keyword (e.g., "Company A stock price") is sent is equal to or greater than the seventh threshold, the processor may recommend a search bot to the user. The search bot may perform a function of automatically providing search results for the specific keyword. The search bot may be implemented in a variety of ways. For example, the search bot may be implemented such that it automatically provides a search result (e.g., real-time search results for "Company A stock price") for a specific keyword in response to sensing a message including the specific keyword in the chat room. As another example, the search bot may be implemented such that it automatically provides real-time search results for the specific keyword at predetermined time intervals (e.g., every hour). As another example of recommending the bot that performs the function of automatically generating frequently shared content in the chat room, the processor may recommend the parsing bot to the user in response to determining that the number of times the URL pattern is sent is equal to or greater than the eighth threshold. The parsing bot may perform a function of automatically sending a URL with updated parameter to the chat room, in response to determining that the parameter of the URL pattern is updated.

The user may check the chat room bot recommendation and, as a user input corresponding to the same, may request to apply the chat room bot, and in response to the user's input requesting to apply the chat room bot, the processor may apply the chat room bot to the chat room.

The method described above may be provided as a computer program stored in a non-transient computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including one or more of, for example, a magnetic medium (such as a hard disk, a floppy disk, and a magnetic tape), an optical medium (such as a CD-ROM and a DVD), a magnetic-optical medium such as a floptical disk, and a ROM, a RAM, a flash memory), and any other non-transitory media configured to store electronic data. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer-readable medium as one or more instructions or codes, or may be sent via a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, when the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

What is claimed is:

1. A method for recommending a bot for managing a chat room, the method being performed by one or more processors and comprising:
acquiring, from a memory, a log of the chat room including a user associated with a user terminal;
analyzing the log of the chat room for predetermined criteria in at least one category;
determining a number of incidents in the log of the chat room of the predetermined criteria in the at least one category; and
when the number of incidents of the predetermined criteria in the at least one category exceeds a predetermined threshold for the at least one category, automatically recommending a chat room bot to the user,
wherein the predetermined criteria in one of the at least one category includes a forbidden word among messages in the chat room within a first predetermined period of time,
the chat room bot includes at least one of: a forbidden word filter bot configured to automatically manage a message including forbidden word, and a force eject bot configured to automatically manage a participant who sent the message including the forbidden word,
the determining the number of incidents in the log of the chat room includes calculating, among the messages in the chat room within the first predetermined period of time, a number of messages that include forbidden word,
the predetermined threshold for one of the at least one category includes a first threshold, and
the automatically recommending the chat room bot to the user includes, in response to determining that the number of the messages including forbidden word is equal to or greater than the first threshold, recommending the forbidden word filter bot to the user.

2. The method according to claim 1, further comprising, in response to an input by the user requesting to apply the chat room bot, applying the chat room bot to the chat room.

3. The method according to claim 1, wherein the forbidden word includes a plurality of textual characters predefined by at least one of a service administrator and the user.

4. The method according to claim 1, wherein:
the determining the number of incidents in the log of the chat room of the forbidden word includes calculating, among participants who sent a message including the forbidden word among the messages in the chat room within the first predetermined period of time, a proportion of participants who were force ejected from the chat room,
the predetermined threshold for one of the at least one category includes a second threshold, and
the automatically recommending the chat room bot to the user includes, in response to determining that the proportion of the force ejected participants from the chat room is equal to or greater than the second threshold, recommending the force eject bot to the user.

5. The method according to claim 1, wherein:
the determining the number of incidents in the log of the chat room of the forbidden word includes calculating, among participants who sent a message the including forbidden word among the messages in the chat room within the first predetermined period of time, the number of participants who were force ejected from the chat room,
the predetermined threshold for one of the at least one category includes a third threshold, and
the automatically recommending the chat room bot to the user includes, in response to determining that the number of the force ejected participants from the chat room is equal to or greater than the third threshold, recommending the force eject bot to the user.

6. The method according to claim 1, wherein the predetermined criteria in one of the at least one category includes a degree of participation of participants in the chat room within a second predetermined period of time, and
the chat room bot includes an encouragement bot configured to increase the degree of participation of the participants in the chat room.

7. The method according to claim 6, wherein:
the determining the number of incidents in the log of the chat room of the degree of participation of the participants includes calculating a participation rate of the chat room based on a total number of the participants in the chat room and a number of the participants who sent at least a fourth threshold of messages within the second predetermined period of time,
the predetermined threshold for one of the at least one category includes a fifth threshold,
the automatically recommending the chat room bot to the user includes, in response to determining that the participation rate of the chat room is equal to or less than the fifth threshold, recommending the encouragement bot to the user, and
the encouragement bot includes an attendance check bot configured to notify a list of the participants who accessed the chat room within a third predetermined period of time or ranking of the degrees of participation of the participants in the chat room within the third predetermined period of time.

8. The method according to claim 7, wherein the fifth threshold is determined based on an average participation rate of a plurality of chat rooms.

9. The method according to claim 6, wherein:
the determining the number of incidents in the log of the chat room of the degree of participation of the participants includes calculating the number of messages sent in the chat room within the second predetermined period of time,
the predetermined threshold for one of the at least one category includes a sixth threshold,
the automatically recommending the chat room bot to the user includes, in response to determining that the number of messages sent in the chat room is equal to or less than the sixth threshold, recommending the encouragement bot to the user, and
the encouragement bot includes a quiz bot that is configured to give a quiz and provide a reward to a participant who answers the quiz.

10. The method according to claim 9, wherein the sixth threshold is determined based on an average number of messages in a plurality of chat rooms.

11. The method according to claim 1, wherein the predetermined criteria in one of the at least one category includes a specific keyword or URL included in a message in the chat room within a fourth predetermined period of time, and the chat room bot includes a share bot that is configured to automatically generate frequently shared content in the chat room.

12. The method according to claim 11, wherein:
the determining the number of incidents in the log of the chat room of the specific keyword or URL included in the message includes calculating a number of times the specific keyword included in the message is sent in the chat room within the fourth predetermined period of time;
the predetermined threshold for one of the at least one category includes a seventh threshold,
the automatically recommending the chat room bot to the user includes, in response to determining that the number of times the specific keyword is sent is equal to or greater than the seventh threshold, recommending the share bot to the user, and
the share bot includes a search bot configured to automatically provide search results for the specific keyword.

13. The method according to claim 12, wherein, in response to sensing a message including the specific keyword in the chat room, the search bot is configured to automatically provide the search results for the specific keyword.

14. The method according to claim 12, wherein the search bot is configured to automatically provide the search results for the specific keyword at predetermined time intervals.

15. The method according to claim 11, wherein:
the determining the number of incidents in the log of the chat room of the specific keyword or URL included in the message includes determining that there is a URL pattern repeatedly included in the message in the chat room within the fourth predetermined period of time, and calculating the number of times the URL pattern is sent,
the predetermined threshold for one of the at least one category includes an eighth threshold,
the automatically recommending the chat room bot to the user includes, in response to determining that the number of times the URL pattern is sent is equal to or greater than an eighth threshold, recommending the share bot to the user, and
the share bot includes a parsing bot that, in response to determining that a parameter of the URL pattern is updated, is configured to automatically send the URL with the updated parameter to the chat room.

16. The method according to claim 1, wherein the chat room bot recommendation is configured to be displayed as a system message in the chat room.

17. A non-transitory computer-readable recording medium storing instructions that, when executed by one or more processors, cause performance of a method comprising:
acquiring, from a memory, a log of a chat room including a user associated with a user terminal;
analyzing the log of the chat room for predetermined criteria in at least one category;
determining a number of incidents in the log of the chat room of the predetermined criteria in the at least one category; and
when the number of incidents of the predetermined criteria in the at least one category exceeds a predetermined threshold for the at least one category, automatically recommending a chat room bot to the user,
wherein the predetermined criteria in one of the at least one category includes a forbidden word among messages in the chat room within a first predetermined period of time,
the chat room bot includes at least one of: a forbidden word filter bot configured to automatically manage a message including forbidden word, and a force eject bot configured to automatically manage a participant who sent the message including the forbidden word,
the determining the number of incidents in the log of the chat room includes calculating, among the messages in the chat room within the first predetermined period of time, a number of messages that include forbidden word,
the predetermined threshold for one of the at least one category includes a first threshold, and
the automatically recommending the chat room bot to the user includes, in response to determining that the number of the messages including forbidden word is equal to or greater than the first threshold, recommending the forbidden word filter bot to the user.

18. An information processing system comprising:
a memory, and
one or more processors connected to the memory and configured to execute one or more computer-readable programs included in the memory, wherein
the one or more programs include instructions for:
acquiring, from the memory, a log of a chat room;
analyzing the log of the chat room for predetermined criteria in at least one category;
determining a number of incidents in the log of the chat room of the predetermined criteria in the at least one category; and
when the number of incidents of the predetermined criteria in the at least one category exceeds a predetermined threshold for the at least one category, automatically sending a chat room bot recommendation to a user terminal associated with a user included in the chat room,
wherein the predetermined criteria in one of the at least one category includes a forbidden word among messages in the chat room within a first predetermined period of time,
the chat room bot includes at least one of: a forbidden word filter bot configured to automatically manage a message including forbidden word, and a force eject bot configured to automatically manage a participant who sent the message including the forbidden word,
the determining the number of incidents in the log of the chat room includes calculating, among the messages in the chat room within the first predetermined period of time, a number of messages that include forbidden word,
the predetermined threshold for one of the at least one category includes a first threshold, and
the automatically sending a chat room bot recommendation to the user includes, in response to determining that the number of the messages including forbidden word is equal to or greater than the first threshold, recommending the forbidden word filter bot to the user.

* * * * *